United States Patent [19]

Brown

[11] 4,402,439
[45] Sep. 6, 1983

[54] BICYCLE SADDLE BAGS

[76] Inventor: Glen J. Brown, 458 Thayer Rd., Santa Cruz, Calif. 95060

[21] Appl. No.: 333,720

[22] Filed: Dec. 23, 1981

[51] Int. Cl.³ .................. B62J 9/00; A45C 13/04
[52] U.S. Cl. ................... 224/32 R; 150/1; 150/DIG. 1; 190/49; 190/60; 224/30 R; 224/37; 224/42
[58] Field of Search ............ 224/30 R, 32 R, 32 A, 224/34, 39, 31, 33 R, 37; 150/49, 51, DIG. 1; 190/49, 50, 60; 220/402; 280/202, 289 A; 24/211 N, 155 BR; 229/55; 248/99

[56] References Cited

U.S. PATENT DOCUMENTS

| | | | |
|---|---|---|---|
| 2,675,151 | 4/1954 | Herbert | 224/30 R |
| 3,596,554 | 8/1971 | Low | 24/211 N X |
| 3,786,772 | 1/1974 | Alley | 224/31 |
| 3,788,532 | 1/1974 | Bish | 224/31 |
| 3,934,803 | 1/1976 | Paulis, Jr. | 150/49 X |
| 3,955,727 | 5/1976 | Montgomery | 224/31 |
| 4,037,778 | 7/1977 | Boyle | 248/99 X |
| 4,045,077 | 8/1977 | DeVone | 224/31 X |
| 4,154,382 | 5/1979 | Blackburn | 224/39 |

FOREIGN PATENT DOCUMENTS

| | | | |
|---|---|---|---|
| 66388 | 2/1948 | Denmark | 280/202 |
| 618743 | 9/1936 | Fed. Rep. of Germany | 224/39 R |
| 79237 | 10/1951 | Norway | 224/30 R |
| 82437 | 9/1953 | Norway | 224/30 R |
| 89300 | 3/1957 | Norway | 224/30 R |

Primary Examiner—William Price
Assistant Examiner—Gary E. Elkins
Attorney, Agent, or Firm—Hamrick, Hoffman & Guillot

[57] ABSTRACT

A pannier bag (10, 10') for bicycles, and the like, comprises a frame (22) shaped to be streamlined in a forward direction of travel of an associated bicycle. A cover (12) arranged on the frame (22) retains same in the desired streamline shape. A three-point mounting arrangement (16) is associated with the frame (22) and cover (12) for mounting them on an associated bicycle in a rigid manner, while a top front to bottom rear zipper (72) provided with a pair of slides (74, 76) permits access to any part of the interior of the bag. A strip (14) of reflective fabric preferably is provided on the outer surface of the cover (12) of the bag so as to run from the front to the rear thereof in order to increase the visibility of the bag, and hence, an associated bicycle, during darkness.

19 Claims, 13 Drawing Figures

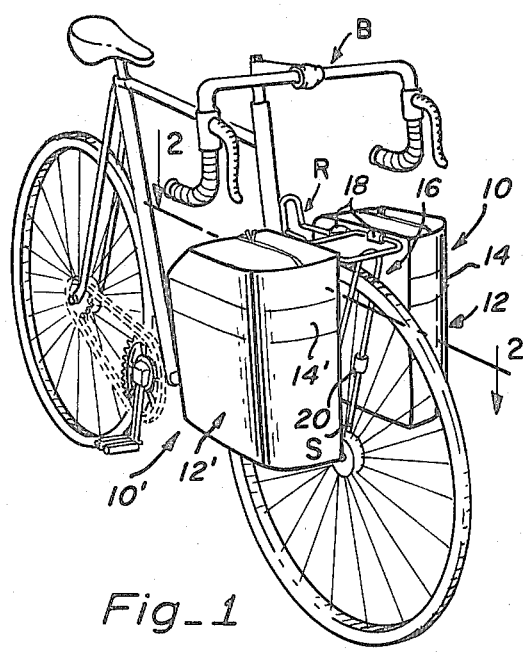
Fig_1
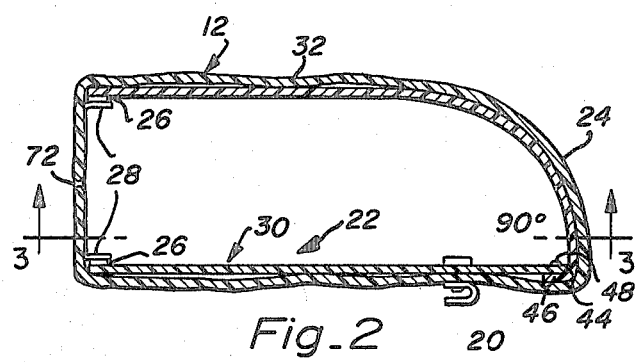
Fig_2
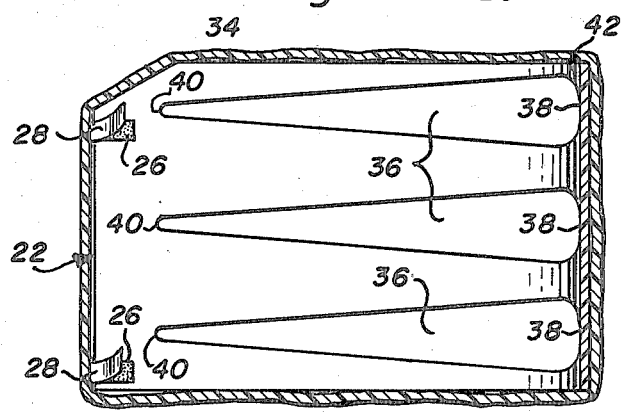
Fig_3
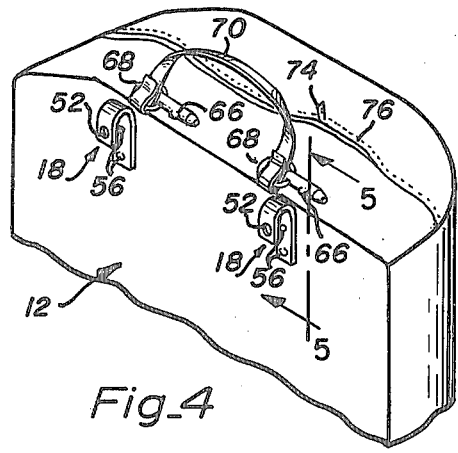
Fig_4
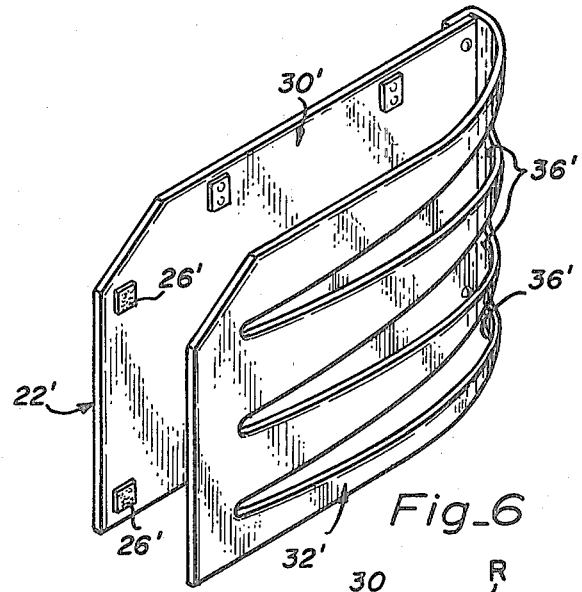
Fig_6
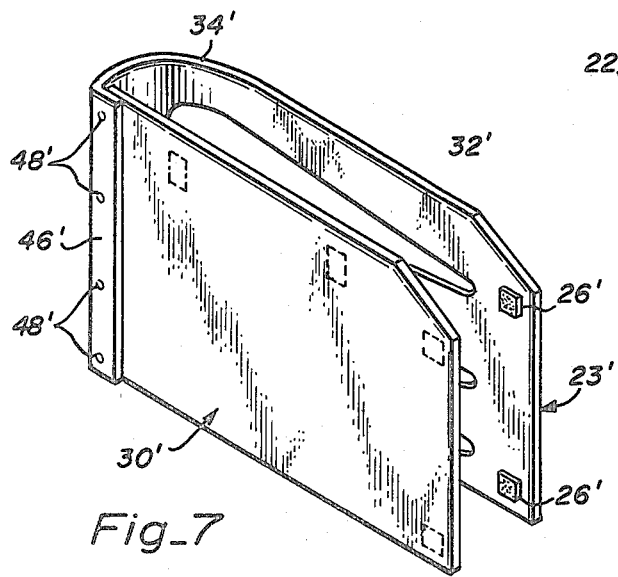
Fig_7
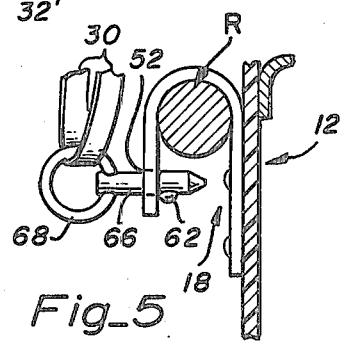
Fig_5

BICYCLE SADDLE BAGS

BACKGROUND OF THE INVENTION

1. Field of the Invention

This invention relates generally to pannier bags for bicycles, and particularly, to bicycle pannier bags which are aerodynamically shaped to reduce wind drag on an associated bicycle.

2. Description of the Prior Art

It is common to arrange bags known as pannier bags on either side of the front and/or rear wheels of a bicycle for the purpose of carrying the gear required by a commuting or touring bicyclist. For years the touring cyclist has had to overcome the drag of peddling a loaded touring bike into a headwind with rectangular touring bags creating unnecessary high wind drag. An example of such bags can be found in U.S. Pat. No. 3,786,972, issued Jan. 22, 1974, to H. R. Alley.

While examples of shapes with low aerodynamic drag are numerous, and the advantages of reducing the drag of bicycles are well known, means of achieving such a shape in a lightweight impact resistant bicycle bag with convenient means of access to the interior thereof have been previously unknown.

Another problem encountered with pannier bags of conventional construction is the use of a spring, elastic card, and the like, to secure the bottom of the lower portion of the rack near the bicycle's axel. These elastic systems permit the bag to flop as the bicycle moves, thus degrading the handling characteristics of the bicycle and, on rough roads, allowing the bag to be thrown from the rack. Examples of means of securing bags to bicycle racks intended to improve upon those problems are found in U.S. Pat. No. 3,955,727, filed May 11, 1976 to Montgomery; Norway Pat. No. 82,437, filed Sept. 14, 1953, to Jensen; Denmark Pat. No. 66,388, filed Mar. 1, 1948 to Janseon; and others. However, these means have not proven to be applicable or effective when used with bicycle racks in common use, especially racks as disclosed in U.S. Pat. No. 4,154,382, filed May 15, 1979 to Blackburn.

An additional problem that arises with regard to the use of pannier bags on touring bicycles is that of access to articles within the bags. Often an article that is desired is in the bottom of a bag, necessitating removal of virtually the entire contents of the bag in order to retrieve the article. The aforementioned U.S. Pat. No. 3,786,972 attempts to alleviate this problem by providing a complicated multicompartment bag construction which actually increases aerodynamic drag on an associated bicycle. The use of such compartments, furthermore, tends to be somewhat inflexible and not readily adaptable to the needs of a specific cyclist.

Another problem associated with the use of pannier bags is the packing of bulky items such as clothing. These items, though light weight, take up much volume necessitating larger panniers and even higher aerodynamic drag.

SUMMARY OF THE PRESENT INVENTION

It is an object of the present invention to provide an aerodynamic pannier, or saddle, bag system for bicycles which will not only reduce the usual wind drag problem, but will actually lower the wind resistance of a bicycle below the drag of an unloaded bike by channeling impinging air smoothly over the bike and its rider.

It is another object of the present invention to provide a pannier bag for bicycles which is constructed in a simple manner from lightweight materials, yet has great strength, durability and impact resistance.

Still another object of the present invention is to provide pannier bags for bicycles which mount rigidly on a conventional pannier mounting bicycle rack so as to be maintained stable and secure even on the roughest road, yet can be secured in place or removed in seconds in a simple and convenient manner.

It is yet another object of the present invention to provide pannier bags for bicycles in which the entire contents of a bag are readily accessible without the need of removing the entire contents of a bag to reach articles at the bottom thereof.

A still further object of the present invention is to provide a means of compressing bulky items in order to pack the same items into a smaller pannier volume.

Briefly, these and other objects are achieved according to the present invention by providing a pannier bag for bicycles which comprises a frame elastically shaped to be streamlined in a forward orientation of the bag, and a cover arranged on the frame for retaining the frame in the desired streamline shape. A securing arrangement is associated with the frame and cover for mounting them on an associated bicycle in a rigid manner, and preferably includes a three-point mounting system engageable with a side rail and a strut of an associated bicycle rack. The frame includes a rigid back portion to which is attached a flexible sheet of material forming a resilient portion and provided with one or more cutouts decreasing in width from a forward orientable peripheral portion of the frame toward a rear edge thereof so as to vary the flexural stiffness of the sheet of flexible material and cause it to assume a desired aerodynamic shape when the sheet is bent back toward its associated rigid back portion. The cover which fits over the frame with the flexible sheet bent as described above is provided with a zipper disposed extending along the upwardly facing surfaces of the cover from an upper front to a lower rear portion of the bag, which zipper advantageously is provided with a pair of slides in order to permit the zipper to be opened from either end and expose the entire interior of the bag from front top rear and to to bottom, and any part thereof to which access is desired. Articles preferably are stored within the interior of the bag in a plurality of color coded stuff sacks which can be easily placed into or removed from the bag through the various openings permitted by the aforementioned zipper arrangement and which facilitates packing bulky items such as clothing into a smaller volume. A strip of reflective fabric preferably is provided on the outer surface of the cover of the bag so as to run from the front to the rear thereof in order to increase the visibility of the bag, and hence, an associated bicycle, during darkness.

It is an advantage of the present invention that the wind drag on a bicycle provided with panier, or saddle, bags according to the invention is actually decreased from that on an unloaded bicycle.

It is another advantage of the present invention that bag flop and loss while riding is eliminated by the three point mounting system according to the invention.

Still another advantage of the present invention is that access to the pannier bags according to the invention is more convenient than with conventional pannier bags.

A still further advantage of the present invention is that the high reflectivity afforded thereby greatly adds to safety of night cycling.

These and other objects and advantages of the present invention will no doubt become apparent to those of ordinary skill in the art after having read the following detailed description of the preferred embodiments which are illustrated in the several figures of the drawing.

IN THE DRAWINGS

FIG. 1 is a diagrammatic, perspective view showing front pannier, or saddle, bags according to the present invention mounted on an associated bicycle;

FIG. 2 is an enlarged, sectional view taken generally along the line 2—2 of FIG. 1;

FIG. 3 is a sectional view taken generally along the line 3—3 of FIG. 2;

FIG. 4 is a fragmentary, partially diagrammatic, perspective view showing a detail of the construction of the left-hand bag as seen in FIG. 1;

FIG. 5 is an enlarged, fragmentary, sectional view taken generally along line 5—5 of FIG. 4, but showing a locking pin in position, securing a bag according to the present invention of an associated bicycle rack;

FIG. 6 is a diagrammatic, perspective view showing the frame, or stiffener, of a right-hand front saddle bag as seen on the left in FIG. 1;

FIG. 7 is a rear perspective view of the frame, or stiffener, as it would appear unflexed before assembly into the fabric cover seen in FIG. 6;

DESCRIPTION OF THE PREFERRED EMBODIMENTS

Figure 8:
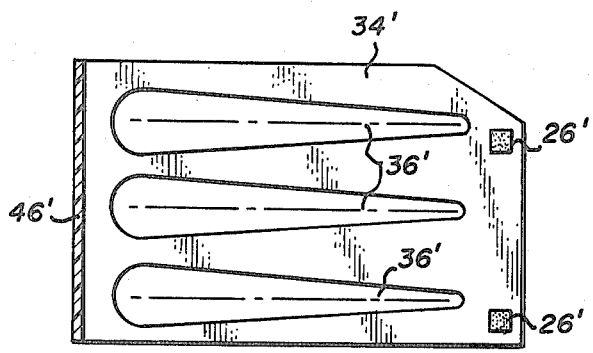
FIG. 8 is a plan view of a flexible sheet used in constructing a right-hand frame, or stiffener as seen in FIGS. 6 and 7, but in unflexed mode.

Referring now more particularly to FIG. 1 of the drawings, a pair of front pannier, or saddle, bags 10 and 10' according to the present invention are shown as mounted on the front rack R of a conventional touring bicycle B, and the like. Rack R, as well as a rear rack to be described below, are of a conventional nature, and preferably are of the kind disclosed in U.S. Pat. No. 4,154,382, issued May 15, 1979, to J. R. Blackburn, and other racks manufactured by JIM BLACKBURN DESIGNS of Campbell, California. Since the racks with which bags 10, 10' can be used are of conventional construction, such racks will not be described in greater detail herein.

Each of the bags 10, 10' includes a cover 12, 12' on which is provided a strip 14, 14' of a reflective fabric arranged extending from the front to the rear of the upper portion of cover 12 in order to add a greater degree of safety for night cycling. These strips 14, 14' are preferably fabricated from "Scotch Lite" super reflective fabric manufactured by the "3 M Co." Such fabric is 200 times brighter than the "Early Warning" fabric usually employed to construct bicycle saddle bags. Each of the bags 10, 10' also includes a three-point securing arrangement 16 which mounts the associated bag 10, 10' as by the illustrated pair of hooks 18 and a generally U-shaped clip 20 which engages a strut S of rack R.

Referring now more particularly to FIGS. 2 and 3 of the drawings, construction of bag 10, which is typical of a front pannier bag according to the invention will now be described in detail.

Bag 10 includes a frame 22 shaped to be streamlined at a front section 24 thereof so as to result in streamlining in a forward orientation of the bag 10. Cover 12 is arranged over frame 22 so as to retain same in the desired streamline configuration in a manner to be described in greater detail below, and is removeably attached to frame 22 by an adhering system comprising pieces 26 of a hook-loop fastening fabric attached to rear portions of frame 22 in a conventional manner and selectively cooperating with tapes 28 extending from inner portions of cover 12 and provided with mating hook-fastener material portions which cooperatively engage with pieces 26.

Frame 22 includes a substantially rigid back portion 30 and a resilient portion 32 attached to back portion 30 and forming a mechanism for shaping frame 22 to be streamlined in the direction toward front section 24 of frame 22.

Resilient portion 32 comprises a sheet 34 constructed of a resilient, typically plastic material. The sheet 34 is provided with at least one and preferably the illustrated plurality of cutouts 36 configured to vary the stiffness of sheet 34 in order to obtain the desired cross section in plan view. As illustrated, sheet 34 is provided with three cutouts 36 each having a cross-section, or width, of decreasing size from an end 38 disposed in the front section 24 of frame 22 toward an end 40 terminating near the pieces 26 provided on sheet 32. The forward peripheral portion 42 of 32 terminates in an upstanding ledge 46 arranged extending substantially 90° from the plane of sheet 32 when same lies unflexed in a single plane, and is attached to back portion 30 adjacent edge 44 thereof. Cover 12 retains sheet 32 in the desired flex position so as to achieve the desired streamlined shape.

Ledge 46 can be secured to back portion 30 in any suitable manner, such as by the illustrated rivet fasteners 48.

Referring now more particularly to FIGS. 4 and 5 of the drawings, securing arrangement 16 includes the aforementioned hooks 18 each comprising a curved planar member fastener to frame 22 as by suitable back fasteners and arranged forming a hook for engaging a side rail of an associated bicycle rack. The terminating end portion of the hook so formed is provided with an aperture 52. A pin 66 is provided that fits through aperture 52 and is held in place by a spinning spring loaded ball 62, preventing it from falling out of the aperture 52. The latter is located such that a top platform member of the rack R is captured between the bend in the hook 18 and pin 66 when pin 66 is inserted as shown in FIG. 5. Pin 66 is provided with a ring 68 through which a handle strap 70 of cover 12 is fed so as to prevent loss when pin 66 is not in use.

Clip 20 which is substantially identical to hooks 18, but without the aforementioned pin assembly, is located and suitably attached to frame 30 so as to engage rack strut S, completing the three point attachment.

A handle 70 is affixed to a seam of cover 12 adjacent the hooks 18 to facilitate handling of bag 10 when same is not mounted on a bicycle.

Extending from the upper front surface of a bag 10 as seen in FIG. 1, to the lower seat surface thereof, as seen in FIG. 2, is a zipper 72 provided with a pair of sliding pieces 74 and 76 which permits zipper 72 not only to be opened completely from one end to the other, but to be opened from either end as desired. In this manner, access to the interior of a bag 10 can be either from the top or from the rear bottom as desired.

FIGS. 6 and 7 of the drawings illustrate a stiffener or frame 22' for a right-hand bag 10' as seen in FIG. 1. As can be seen, frame 22' is merely a mirror image of frame 22, and thereofore like parts of frame 22' are given the same numbered definition with a prime added as the equivalent parts of frame 22.

FIG. 8 shows sheet 34' of frame 22' in an unflexed mode so as to reveal the contours of such sheet 34'. It will be appreciated that the contour of sheet 34 will be merely the reverse of the illustrated sheet 34'.

Figure 9:
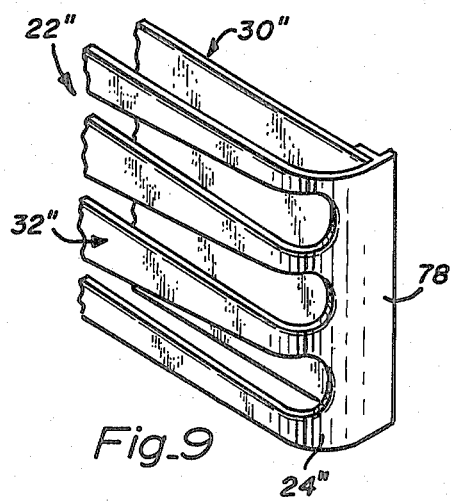
FIG. 9 is a fragmentary, diagrammatic, perspective view showing a modified form of a right-hand frame, or stiffener, for a pannier, or saddle, bag according to the present invention.

Referring now to FIG. 9 of the drawings, a modified embodiment of a stiffener for a front pannier bag according to the present invention, designated 10'' is shown wherein the stiffener or frame 22'' includes back portion 30'' and a resilient portion 32'' and is provided with an extension in the form of a lip 78 arranged at the front section 24'' of the frame 22'' for reducing the gap between the front sections of a pair of front pannier bags relative to the associated front bicycle wheel in order to significantly further reduce aerodynamic drag and improve handling of an associated bicycle. A cover 12 can be reconfigured in a suitable known manner so as to fit over the lip 78 of a frame 22''.

Figure 10:
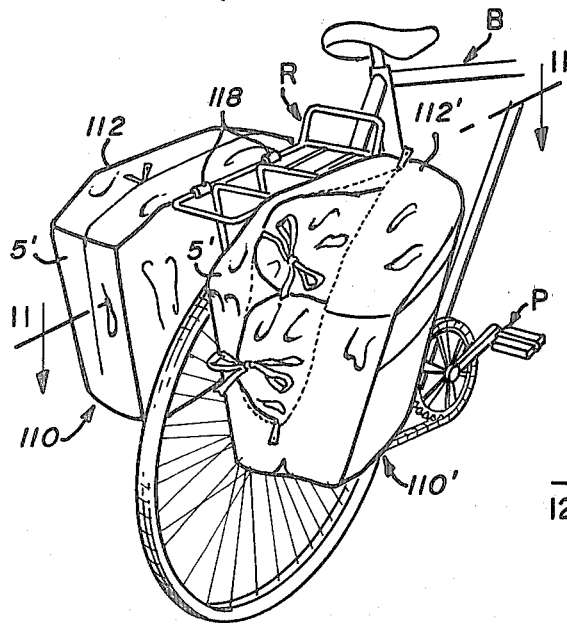
FIG. 10 is a fragmentary, diagrammatic, perspective view showing rear pannier, or saddle, bags according to the present invention, with one bag open to reveal the stuff bags disposed therein.

FIG. 10 illustrates a pair of rear panier bags 110 and 110' according to the present invention and disposed on a rear rack R' of a bicycle B. As with bags 10, 10', each of the bags 110, 110' comprises a cover 112, 112' having disposed thereon a reflective strip 114 and being mountable on a rack R' by a securing arrangement 116 which includes a pair of hooks 118, each like hooks 18, and clip 120 (FIG. 11) which functions in the manner of a clip 20 to engage a strut S' of rack R'.

Figure 11:
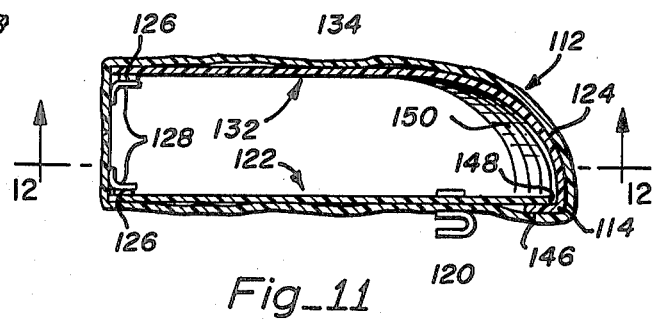
FIG. 11 is an enlarged, sectional view taken generally along the line 11—11 of FIG. 10.
Figure 12:
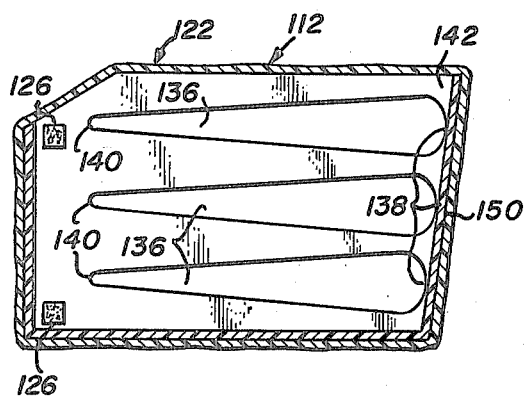
FIG. 12 is a sectional view taken generally along the line 12—12 of FIG. 11.
Figure 13:
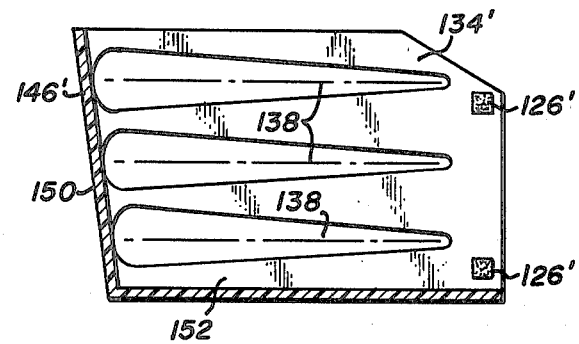
FIG. 13 is a plan view, similar to FIG. 8, but showing an unflexed resilient portion of the frame, or stiffener, seen in FIG. 12 for a rear bag according to the present invention.

FIGS. 11-13 show the details of a bag 110 as illustrated in FIG. 10. As can be seen, a rear pannier bag 110 according to the present invention includes a frame 122 having a front section 124 and provided thereon toward the rear edge thereof with pieces 126 of hook-fastener material which cooperate with like tapes 128 secured to cover 112 in order to removably attach the latter to frame 122.

Frame 122 includes a back portion 130 and a resilient portion 132 constructed from a sheet 134 of flexible material and provided with a plurality of cutouts 136 of decreasing size from a forwardly disposed end 138 to a rear end 140. The materials used for frame 122 can be those employed for a frame 22.

Ends 138 of cutouts 136 are disposed in a peripheral portion 142 which is arrangeable adjacent and edge 144 of the generally rectangular in plan back portion 130 of frame 122. An upstanding ledge 146 stands substantially 90° from the plane of sheet 134 when same is in an unflexed mode, with ledge 146 advantageously being attached to back portion 130 as by the illustrated rivet fasteners 148, and the like.

The significant change between a front bag 10, 10' and a rear bag 110, 110' is that the forward edge 150 of sheet 134, and the corresponding edge of back portion 130, is sloped rearwardly from top to bottom so as to insure clearance for a pedal P (FIG. 10) and a cyclist's feet (not shown) while peddling in an associated bicycle B. FIG. 13 shows the right-hand rear pannier bag 110', with the like numbers to the left-hand bag 110 being distinguished by a prime. More significantly, FIG. 13 shows a sheet 134' in unflexed mode so that the slant of the forward edge 150' can be readily appreciated. In addition, it will be appreciated that the configuration of sheet 134' is similar to sheet 34' in that the upper edge slopes rearwardly in order to assure drainage from cover 112' (FIG. 10) during rain, snow, sleet, and like precipitation storms.

As can be readily understood from the above description and from the drawings, a front or rear pannier bag according to the present invention creates a complete performance system suitable for day tripping to commuting to extended tours. Such a system is more than just the sum of its part, inasmuch as it effectively reduces drag to below that normally encountered with an unloaded bicycle, while eliminating bag flop and permitting easy access to even the bottom of a bag as desired. In addition, the bags facilitate night cycling due to the use of a strip of highly reflective material on each bag.

Whereas, the preferred embodiments of the present invention have been described above, it is contemplated that other alterations and modifications may become apparent to those skilled in the art after having read the above disclosure. It is therefore intended that the apending claims be interpreted as covering all such alterations and modifications as fall within the true spirit and scope of the invention.

What is claimed is:

1. A stiffener for a streamlined bicycle saddle bag or the like comprising:
   a rigid substantially planar back member having a forward edge and an aft edge; and
   a flexible sheet member having one edge thereof attached to said back member along said forward edge in such a manner that when unflexed, said sheet member extends away from said back member, said sheet member being provided with means for varying the flexibility thereof such that when a forward portion thereof is flexed in a predetermined manner, a rearward portion thereof is disposed in spaced apart generally parallel relationship to said back member.

2. A stiffener as defined in claim 1 wherein said means for varying the flexibility of said sheet member includes at least one aperture formed in said forward portion.

3. A stiffener as recited in claim 2 wherein said aperture is elongated in a direction of streamlining extending from said forward edge to said aft edge and tapers from a relatively wide width in said forward portion to a relatively narrow width in said rearward portion.

4. A stiffener as defined in claim 1 wherein said means for varying said flexibility includes a plurality of apertures formed in said sheet.

5. A stiffener as defined in claim 4 wherein said apertures are elongated and extend from points in said forward portion to points in said rearward portion.

6. A stiffener as defined in claim 5 wherein said elongated apertures taper from relatively wide widths in said forward portion to relatively narrow widths in said rearward portion.

7. A pannier bag for bicycles, and the like, streamlined in the direction of intended forward movement and comprising:
a frame shaped to be streamlined in said direction of forward movement of said bag, said frame including a substantially rigid back portion and a resilient portion attached to said back portion along a forward edge thereof, said resilient portion to extending transversely away from said back portion at the point of attachment and being bowed such that a substantial part thereof is disposed in spaced apart generally parallel disposition relative to said back portion;
a cover enveloping said frame and serving to retain said resilient portion in said bowed disposition; and
securing means associated with said frame and said cover for mounting said bag on a bicycle.

8. A bag as defined in claim 7 wherein said resilient portion is comprised of a sheet of resilient material provided with at least one cutout configured to vary the stiffness of said sheet such that when bowed said sheet assumes a desired streamlined configuration.

9. A bag as defined in claim 8 wherein said cutout is elongated and extends in the direction of said streamlining and decreases in width toward the aft end of said bag.

10. A bag as defined in claim 9, wherein said resilient portion includes a plurality of said cutouts.

11. A bag as defined in claim 10, wherein said back portion is planar and generally rectangular in plan, and said sheet is provided on a peripheral portion thereof with an upstanding ledge arranged extending 90° from said sheet when same lies unflexed in a single plane, said ledge being attached to said back portion and said sheet being flexed into a position lying in a plane substantially parallel to the said back portion, said cover retaining said sheet in a flexed position.

12. A bag as defined in claim 11, wherein said back portion defines a plurality of edges, with said ledge being attached to a one of said edges, said one of said edges being arrangeable in a forward direction of movement of an associated bicycle, and the cutout provided in said sheet having a cross section of decreasing size away from said ledge.

13. A bag as defined in claim 12, wherein said cover has a top and a bottom, and said one of said edges is sloped inwardly of said back portion from said top of said cover to said bottom of said cover for providing clearance for a pedal of an associated bicycle, said frame being for a pannier bag.

14. A bag as defined in claim 13, wherein said securing means includes at least one curved planar member fastened to said cover and said frame and arranged forming a hook for engaging an associated bicycle rack, said planar member being provided with an aperture, a flexible flap being affixed to said member and provided with a hole, and pin means selectively insertable into said aperture and said hole simultaneously for retaining said member on an associated bicycle rack.

15. A bag as defined in claim 14, wherein there are a pair of substantially members each like said planar member, and a third member like said pair but spaced from and oriented obliquely to said pair of substantially parallel members, and a pair of flexible flaps including said flexible flap, and a pair of pins mounted on said pair of flexible flaps, each of said pairs of substantially parallel members having one each of said flexible flaps and pins cooperatively associated therewith.

16. A bag as defined in claim 15, wherein said cover and said frame include adhering means associated therewith for removably attaching said cover to said frame.

17. A bag as defined in claim 16, wherein said adhering means comprises hook-fastening means.

18. A bag as defined in claim 10, wherein said cover and said frame include adhering means associated therewith for removably attaching said cover to said frame.

19. A bag as defined in claim 10, wherein said adhering means comprises hook-fastening means.

* * * * *